(12) United States Patent
Wang et al.

(10) Patent No.: US 8,441,680 B2
(45) Date of Patent: May 14, 2013

(54) BLACK POINT COMPENSATION IN A TIPP ARCHITECTURE

(75) Inventors: Yao Rong Wang, Webster, NY (US); Lalit Keshav Mestha, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 730 days.

(21) Appl. No.: 12/507,515

(22) Filed: Jul. 22, 2009

(65) Prior Publication Data

US 2011/0019212 A1    Jan. 27, 2011

(51) Int. Cl.
*H04N 1/60*    (2006.01)

(52) U.S. Cl.
USPC .................. 358/1.9; 358/518; 358/504

(58) Field of Classification Search .................. None
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 5,278,589 A | 1/1994 | Wong | |
| 5,365,074 A | 11/1994 | Genovese | |
| 5,489,969 A | 2/1996 | Soler et al. | |
| 5,568,246 A | 10/1996 | Keller et al. | |
| 5,570,172 A | 10/1996 | Acquaviva | |
| 5,596,416 A | 1/1997 | Barry et al. | |
| 5,995,721 A | 11/1999 | Rourke et al. | |
| 6,554,276 B2 | 4/2003 | Jackson et al. | |
| 6,607,320 B2 | 8/2003 | Bobrow et al. | |
| 6,654,136 B2 | 11/2003 | Shimada | |
| 6,904,255 B2 | 6/2005 | Kera et al. | |
| 7,136,616 B2 | 11/2006 | Mandel et al. | |
| 7,177,585 B2 | 2/2007 | Matsuzaka et al. | |
| 7,188,929 B2 | 3/2007 | Lofthus | |
| 2005/0036159 A1* | 2/2005 | Sharma et al. | 358/1.9 |
| 2005/0071104 A1 | 3/2005 | Viturro et al. | |
| 2006/0115288 A1 | 6/2006 | Roof | |
| 2006/0197966 A1 | 9/2006 | Viturro et al. | |
| 2007/0139672 A1 | 6/2007 | Klassen | |

OTHER PUBLICATIONS

Lalit Keshav Mestha, U.S. Appl. No. 12/391,473, filed Feb. 24, 2009.
Lalit Keshav Mestha, U.S. Appl. No. 12/464,610, May 12, 2009.
Connie Purdum, U.S. Appl. No. 12/421,745, Apr. 10, 2009.

* cited by examiner

*Primary Examiner* — Twyler Haskins
*Assistant Examiner* — Christopher D Wait
(74) *Attorney, Agent, or Firm* — Pillsbury Winthrop Shaw Pittman, LLP

(57) ABSTRACT

A method for calibrating an image printing system that includes a plurality of parallel printers, where each of the printers has a minimum luminance value. The method includes determining a minimum luminance value profile for the plurality of printers in the image printing system based on the minimum luminance values of each of the printers in the image printing system, determining a black point compensation function based on the determined minimum luminance value profile, adjusting luminance values for input image data using the determined black point compensation function, and rendering, with the parallel printers, images on substrates based on the input image data with adjusted luminance levels.

15 Claims, 4 Drawing Sheets

BLACK POINT COMPENSATION IN A TIPP ARCHITECTURE

BACKGROUND

1. Field

The present disclosure relates to a method and a system for calibrating an image printing system that includes a plurality of parallel printers.

2. Description of Related Art

Generally, the black point compensation (BPC) function is used for RGB images to retain shadow details in images because many images contain colors that are darker than the darkest color a printer can make. Without black point compensation, details in these shadow regions may be lost. These details may contain information the viewer knows should be there (such as, for example, the folds of a dark coat, the strands of dark hair, etc). Their absence when printed may be displeasing for a particular user.

The black point compensation may include an input L* (input image data) to output L* (image data to be rendered by the printer) mapping function that is used in the color management look-up table (LUT). This input L* to output L* mapping function is a parameterized quadratic or parabolic function which is used to modify the L* values of all the node colors in the multi-dimensional look up table. The black point compensation is used as a single-valued scalar function.

The black point compensation function that retains the details in dark colors (e.g., hairs) includes two parameters: minimum luminance value, $L^*_{min}$ and slope, m. These two parameters (i.e., $L^*_{min}$ and m) are used to control the effects (i.e., retain darkness vs details) in images. Digital production color printers, such as the Xerox Corp. DocuColor™ 5000 and 8000 Digital Presses, may show excessive gloss levels in color prints particularly when images with dark shadow colors are printed. In case of these digital production color printers, a gloss control slider at a graphical user interface (GUI) may also be linked to adjust these two parameters (i.e., $L^*_{min}$ and slope) to provide compensation for excessive amount of gloss levels in color prints or images.

In a tightly integrated parallel printing (TIPP) configuration, the minimum luminance value $L^*_{min}$ for each of the printers may be different. For example, the minimum luminance value $L^*_{min}$ for the image printing system may vary from 10 to 15 from one printer to another printer. By using these different minimum luminance values $L^*_{min}$ in the existing black point compensation function may result in a mismatch in RGB images, particularly in shadow details.

The present disclosure proposes to extend the existing black point compensation to a TIPP configuration such that the shadow details and the gloss levels from the two printers will match.

SUMMARY

According to one aspect of the present disclosure, a method for calibrating an image printing system that includes a plurality of parallel printers, where each of the printers has a minimum luminance value. The method includes determining a minimum luminance value profile for the plurality of printers in the image printing system based on the minimum luminance values of each of the printers in the image printing system, determining a black point compensation function based on the determined minimum luminance value profile, adjusting luminance values for input image data using the determined black point compensation function, and rendering, with the parallel printers, images on substrates based on the input image data with adjusted luminance levels.

According to another aspect of the present disclosure, a system for calibrating an image printing system that includes a plurality of parallel printers, where each of the printers having a minimum luminance value. The system includes a controller and marking engines associated with the parallel printers. The controller is configured to: (i) determine a minimum luminance value profile for the plurality of printers in the image printing system based on the minimum luminance values of each of the printers in the image printing system, (ii) determine a black point compensation function based on the determined minimum luminance value profile, and (iii) adjust luminance values for input image data using the determined black point compensation function. The marking engines associated with the parallel printers are configured to render images on substrates from input image data with adjusted luminance levels.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments of the present disclosure will now be disclosed, by way of example only, with reference to the accompanying schematic drawings in which corresponding reference symbols indicate corresponding parts, in which.

DETAILED DESCRIPTION

Figure 1:
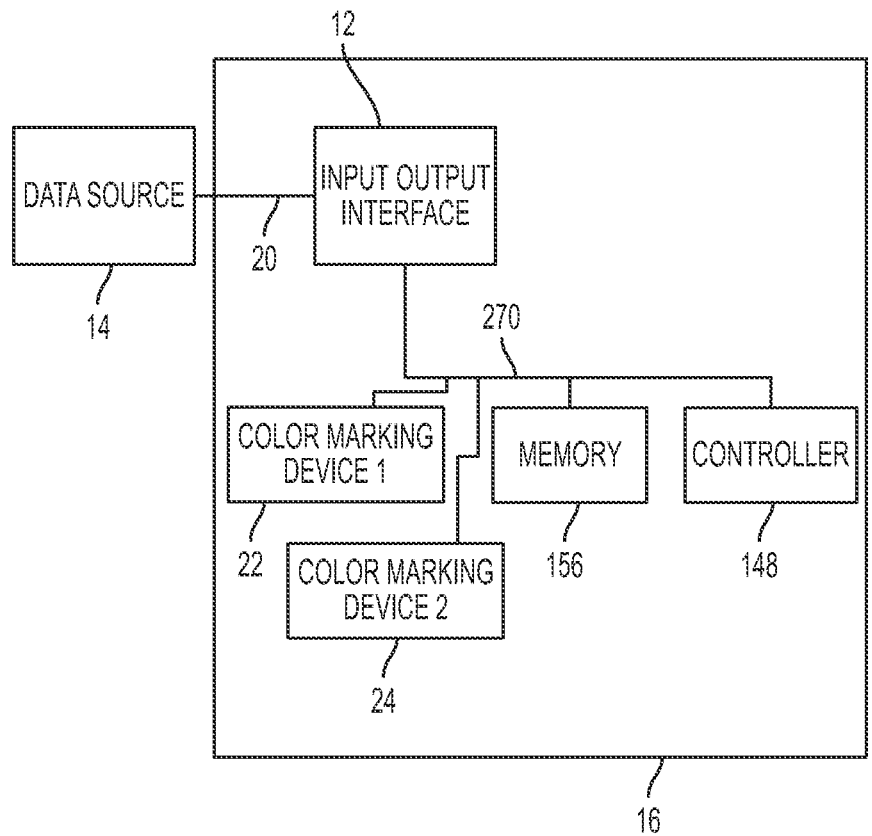
FIG. 1 illustrates a functional block diagram of an exemplary parallel printing system in accordance with an embodiment of the present disclosure.

With reference to FIG. 1, an exemplary digital parallel printing system 10 includes an input/output interface in the form of a print server 12, which receives image data from a locally or a remotely located computer, computer network, scanner, digital camera, or other data source 14 capable of generating an electronic image or text data, and a printing assembly 16 capable of printing onto a print medium, all interconnected by links 20. The links 20 may be a wired or wireless link or other means capable of supplying electronic data to and/or from the connected elements. The parallel printing system 10 includes a plurality of integrated marking engines 22, 24 referred to herein as printers. The marking engines or the printers 22, 24 are capable of reproducing images or text received from the data source 14 by causing a marking medium, such as ink, toner or the like, to be arranged in appropriate configurations on a substrate.

The print server 12 may include a display device that may be provided to enable the user to control various aspects of the printing system 10, in accordance with the embodiments disclosed therein. The display device may include a cathode ray tube (CRT), liquid crystal display (LCD), plasma, or other display device.

The digital parallel printing system 10 may include a controller 148 that controls the operation of other components of the printing system 10 as necessary, performs any necessary calculations and executes any necessary programs for implementing the processes of the printing system 10 and its individual components, and controls the flow of data between other components. The digital parallel printing system 10 may include a memory 156 that serves as a buffer for information coming into or going out of the printing system 10, may store any necessary programs and/or data for implementing the functions of the printing system 10, and/or may store data at various stages of processing. Furthermore, it should be appreciated that the memory 156, while depicted as a single entity, may actually be distributed. Alterable portions of the memory 156 are implemented using static or dynamic RAM. However, the memory 156 may also be implemented using a floppy disk and disk drive, a write-able optical disk and disk drive, a hard drive, flash memory or the like. The generally static portions of the memory 156 are implemented using ROM. However, the static portions may also be implemented using other non-volatile memory, such as PROM, EPROM, EEPROM, an optical ROM disk, such as a CD-ROM or DVD-ROM, and disk drive, flash memory or other alterable memory, as indicated above, or the like.

The digital parallel printing system 10 may accept content for images in any one of a number of possible formats, such as, for example, TIFF, JPEG, or Adobe® PostScript®. This image content is then "interpreted" or "decomposed" in a known manner into a format usable by the marking engine controller.

The input image data may be represented in terms of the constituent process colors according to the color space model (e.g., CYMK, RGB, L*a*b*, etc.). Device dependent color space values, such as RGB and CMYK input image data, may be converted to a device-independent color space, such as CIE-LAB color space, using transformation algorithms or LUT, as known in the art, for example, using ICC color management profiles associated with a printer. In CE-LAB (L*, a*, b*) color space L* values correspond to the luminance dimension, and a* and b* correspond to chromatic values, i.e., green-magenta and blue-yellow, respectively. While CIE-LAB color space is disclosed, it will be appreciated that other device-independent color spaces could also be used, such as, for example, CIE 1976 (L*, u*, v*), CIE XYZ, or LCH.

The printing system may incorporate "tandem engine" printers, "parallel" printers, "cluster printing," "output merger" or "interposer" systems, and the like, as disclosed, for example, in U.S. Pat. No. 4,579,446 to Fujino, et al.; U.S. Pat. No. 4,587,532 to Asano; U.S. Pat. No. 5,489,969 to Soler, et al.; U.S. Pat. No. 5,568,246 to Keller, et al.; U.S. Pat. No. 5,570,172 to Acquaviva; U.S. Pat. No. 5,596,416 to Barry, et al.; U.S. Pat. No. 5,995,721 to Rourke, et al.; U.S. Pat. No. 6,554,276 to Jackson, et al., U.S. Pat. No. 6,654,136 to Shimada; U.S. Pat. No. 6,607,320 to Bobrow, et al.; and in copending U.S. Pat. No. 7,136,616 to Mandel, et al.; and U.S. Pat. No. 7,188,929 to Lofthus, the disclosures of all of these references being incorporated herein by reference.

A typical parallel printing system is one which feeds paper from a common paper stream to a plurality of printers, which may be horizontally and/or vertically stacked. Printed media from the various printers is then conveyed from the printers to a common finisher where the sheets associated with a single print job are assembled.

In FIG. 1, two printers 22, 24, are illustrated, which print using the same marking media, such as inks or toners. The printers 22, 24 may be of the same modality (e.g., black (K), custom color (C), process color (P) or of different print modalities. Although only two printers are shown, it will be appreciated that fewer or more printers, of the same or different print modalities, such as three, four, or more printers, may be associated with a single print server. The printers may be capable of generating more than one type of print modality, for example, black and process color.

Figure 2:
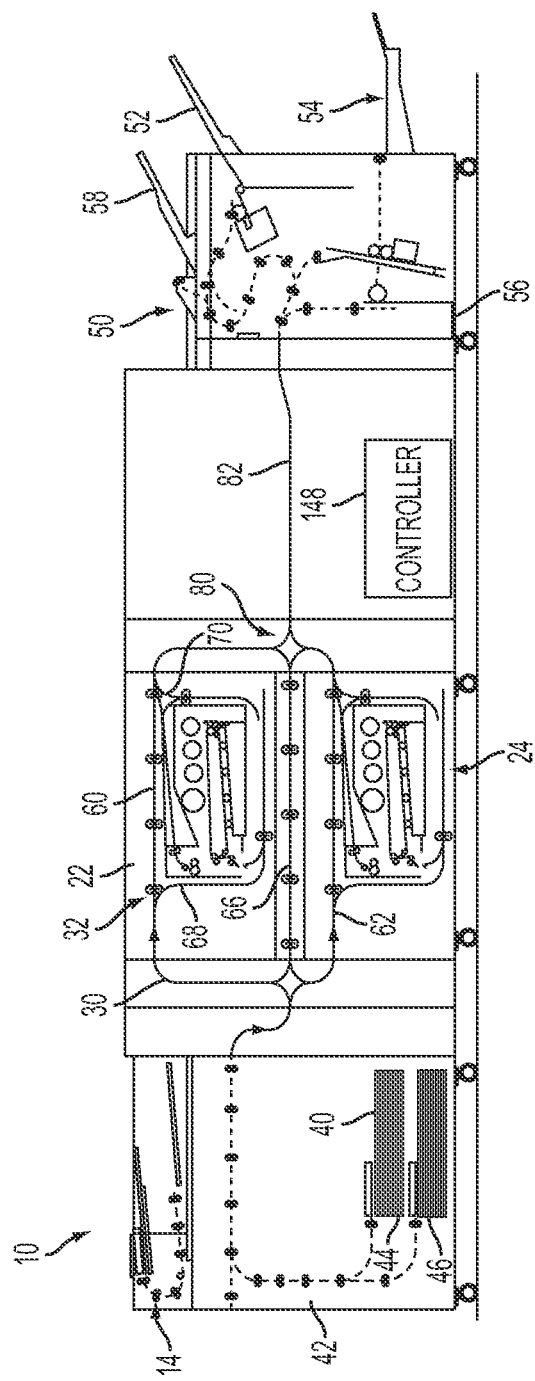
FIG. 2 illustrates a schematic side view of the parallel printing system in accordance with an embodiment of the present disclosure.

With reference now to FIG. 2, a schematic side view of the parallel printing system 10 (here illustrated as a copier) includes a media transporting system 30, such as a network of flexible paper pathways, which feeds to and collects print media from each of the printers 22, 24. The paper pathways may include a plurality of drive elements, illustrated as pairs of rollers 32, although other drive elements are also contemplated. At any one time, a plurality of the printers 22, 24 may be printing. More than one of the printers may be employed in printing a single print job. More than one print job may be in the course of printing at any one time.

The printers 22, 24 may be fed with print media 40 from a single high speed and capacity feeder module 42 including a plurality of print media sources 44, 46, although it will be appreciated that one or more of the printers may be fed from one or more separate feeders. The print media sources 44, 46 may be loaded with the print media 40 of different types. A finisher 50 with one or more separate finishing capabilities, here represented by output trays 52, 54 receives printed media from any one or more of the stacked printers 22, 24. The job output trays 52, 54 may include one or more special trays for multiple job collections. The finisher 50 also includes a purge media tray 56 and output media tray 58, which are used for diverting printing control sheets during printing jobs while maintaining the integrity of the print jobs.

The media handling system 30 includes a downstream print media highway or highways 60, 62 which extends from the feeder module 42 to the finisher module 50 and may include one or more upstream print media highways 66, by which media which has been output by one printer, such as the printer 22, may be returned to the printer 22 or sent to the printer 24 for overprinting. Pathways 68, 70 feed the print media between the downstream media highways 60, 62 and selected ones of the printers. For example, in printing a two page document, page one of the document may be sent to the printer 22 and page two to the printer 24, where pages one and two may be formed on opposite sides of the same sheet or on separate sheets. Thereafter, these sheets are sent to the finisher 50 in sequential ways such that the output maintains the integrity of the print job.

The highway(s) 60, 62, 66 and/or the pathways 68, 70 may include inverters, reverters, interposers, bypass pathways, and the like as known in the art to direct the print substrate between the highway and a selected printer or between two printers. It will be appreciated that the printers may be duplex or simplex printers and that a single sheet of paper may be marked by two or more of the printers or marked a plurality of times by the same printer, before reaching the finisher 50. FIG. 2 illustrates the printers 22, 24 vertically stacked although it is to be appreciated that the printers may be stacked horizontally. The highways 60, 62 converge at 80 from where a single highway 82 carries the printed paper to the finisher 50.

Figure 3:
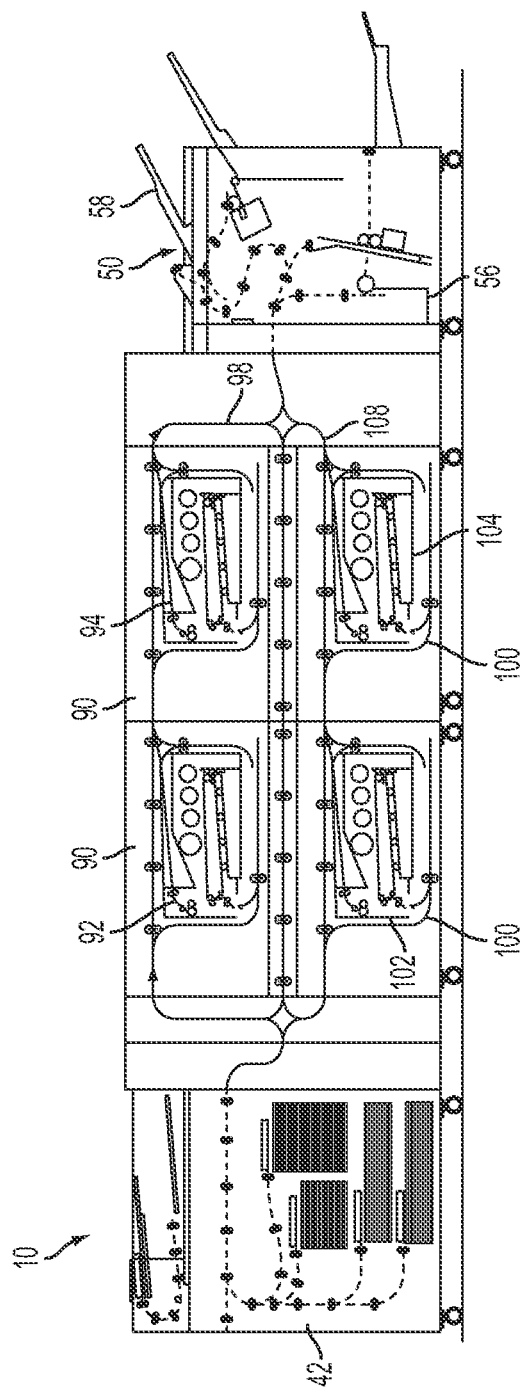
FIG. 3 illustrates another schematic side view of the parallel printing system in accordance with an embodiment of the present disclosure.

As illustrated in FIG. 3, a printing system similar to system 10, except as otherwise noted, includes a first group 90 of printers 92, 94 with a first media highway 98 and a second group 100 of printers 102, 104 with a second media highway 108. The two media highways may be linked to the same feeder 42 and finisher 50 or to a separate feeder and/or finisher.

For any system, one of the printers of a particular modality is designated as a reference or master printer. For purposes of discussion, it will be assumed that each of the printers in the systems of FIGS. 2 and 3 are of the same modality, for example, CMYK printers, although it will be appreciated that there may be printers of different modalities in the systems. The other printer(s) of the same modality as the master printer, are referred to as slave printers. For purposes of discussion, the printer 22 will be considered as the master printer of the system of FIG. 2 and the printer 92 will be considered as the master printer of the system of FIG. 3, with the remaining printer(s) considered as slave printers, although it will be appreciated that for these systems, any one of the printers could be designated as the master printer.

Each printer 22, 24, 92, 94, 102, and 104 includes an image forming component capable of forming an image on the print media. Suitable printers include electrophotographic printers, ink-jet printers, including solid ink printers, thermal head printers that are used in conjunction with heat sensitive paper, and other devices capable of marking an image on a substrate. In the case of an electrophotographic printer, the image forming component may include a charge retentive surface, such as a photoconductor belt or drum, a charging station for each of the colors to be applied, an image input device which forms a latent image on the photoreceptor, and a toner developing station associated with each charging station for developing the latent image formed on the surface of the photoreceptor by applying a toner to obtain a toner image. A pretransfer charging unit charges the developed latent image. A transferring unit transfers the toner image thus formed to the surface of a print media substrate, such as a sheet of paper where it is fused by a fusing device. Other methods of forming an image are also contemplated.

As discussed earlier, in order to preserve shadow details of the RGB image, a parameterized lightness (L*) adjustment is applied to reduce the input L* (input image data) range to a realizable output L* (image data to be rendered by the printer) range. This parameterized lightness L* adjustment is referred to as a black point compensation, and the parameter selection may be based on the marking engines minimum L* capability. The black point compensation is thus used to improve image quality by retaining shadow details of the RGB image.

Generally, in the tightly integrated parallel printing (TIPP) configuration, two or more marking or print engines are working together to produce a common output stream of documents. A disparity between each marking or print engines minimum L* capability presents unique print quality challenges.

In accordance with one embodiment, a custom or a common built profile uses a level of black point compensation that takes into account the minimum L* capabilities of all supported engines simultaneously. In other words, as will be explained in detail with respect to FIG. 4, the marking or print engines are configured to sacrifice potential gamut in order to match the marking or print engine with the smallest gamut. Generally, in color reproduction, gamut refers to a subset of colors that can be accurately represented in a given circumstance.

In one embodiment, the image printing system's black point compensation is based on a weighted combination of the minimum L* of the supported marking or print engines. A custom or common profile may be exploited to reduce bandwidth, reduce print path complexity, and guarantee well matched tone rendition in the image printing systems that support multiple engines. Therefore, in order to achieve color consistency in the parallel printing system, the minimum L* of the supported marking or print engines in the parallel printing system are to be maintained the same.

In an embodiment, a system for calibrating an image printing system 10 (e.g., as shown in FIGS. 1-3) is provided. The image printing system 10 includes a plurality of parallel printers, where each of the printers having a minimum luminance value. The system includes a controller and marking engines associated with the parallel printers. The controller is configured to: (i) determine a minimum luminance value profile for the plurality of printers in the image printing system based on the minimum luminance values of each of the printers in the image printing system, (ii) determine a black point compensation function based on the determined minimum luminance value profile, and (iii) adjust luminance values for input image data using the determined black point compensation function. The marking engines associated with the parallel printers are configured to render images on substrates from input image data with adjusted luminance levels. An example of such an image printing system with a plurality of parallel printers is a networked printing system.

Figure 4:
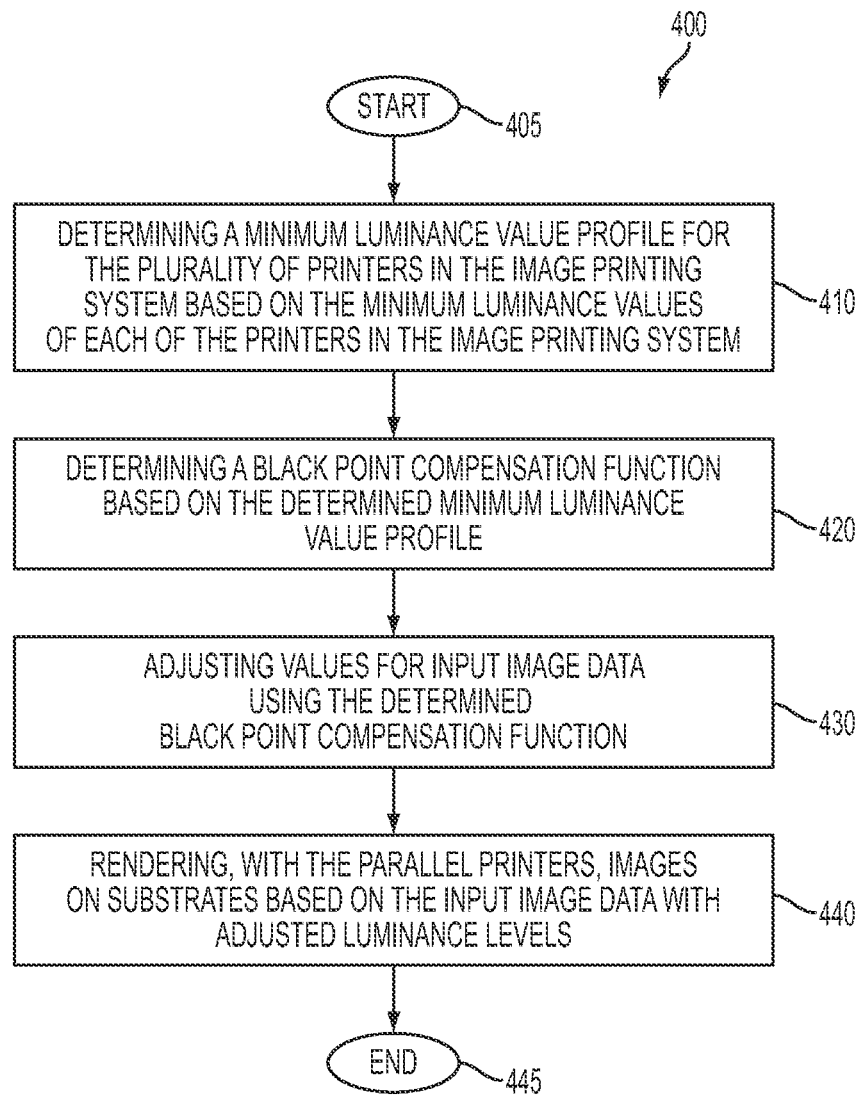
FIG. 4 illustrates an exemplary method for calibrating an image printing system that includes a plurality of parallel printers in accordance with an embodiment of the present disclosure.

FIG. 4 illustrates a method 400 for calibrating an image printing system (as shown in FIGS. 2 and 3) that includes a plurality of parallel printers in accordance with an embodiment of the present disclosure. The method 400 shares the black point information of the plurality of parallel printers in the image printing system 10, and compensates the shadow details of the RGB image using this information. Each of the parallel printers in the image printing system include a minimum luminance value. The method 400 begins at procedure 405. At procedure 410, a controller is configured to determine a minimum luminance value profile $L^*_{min\ c}$ for the plurality of printers in the image printing system 10 based on the minimum luminance values of each of the printers in the image printing system 10.

In one embodiment, the determined minimum luminance value profile $L^*_{min\ c}$ is a common or a fleet profile for the plurality of printers in the networked printing system.

In one embodiment, the determined minimum luminance value profile $L^*_{min\ c}$ is a common or a fleet profile for the plurality of printers in the image printing system 10. In such an embodiment, the minimum luminance value of the common or the fleet profile is the maximum value of the minimum luminance value of each of the printers in the image printing system 10.

In one embodiment, the image printing system 10 may include two printers, i.e., a first printer and a second printer. In such embodiment, the darkest L* value from each printer's gamut is determined, where the darkest L* value from the first printer's gamut is determined to be $L^*_{min\ 1}$ and the darkest L* value from the second printer's gamut is determined to be $L_{min\ 2}$. In order to achieve best matching of the shadow details of the RGB image, the larger of $L^*_{min\ 1}$ and $L^*_{min\ 2}$ (i.e., in the case of the image printing system having two printers) is selected as the common or fleet profile $L^*_{min\ c}$. The common or a fleet profile for the two printers in the image printing system is thus calculated using the following equation:

$$L^*_{min\ c} = \max(L^*_{min\ 1}, L^*_{min\ 2}) \qquad (a)$$

The common or a fleet profile for the plurality of printers in the image printing system $L^*_{min\ c}$ thus calculated should be used for both printers (i.e., the first printer and the second printer of the image printing system 10) in order to achieve the color consistency in the image printing system 10.

The present disclosure is not limited to the image printing system having two printers. Instead, if the image printing system includes multiple printers, such as three, four, or more printers, the common or a fleet profile for the plurality of printers in the image printing system is calculated using the following equation:

$$L^*_{min\ c} = \max(L^*_{min\ 1}, \ldots L^*_{min\ N}) \quad \text{(b)}$$

where N is the number of printers in the image printing system.

As noted earlier, in TIPP architecture, a disparity between each marking or print engines minimum L* capability may exist. For example, the first printer may include a minimum luminance value $L^*_{min\ 1}$ value equal to 8 and the second printer may include a minimum luminance value $L^*_{min\ 2}$ value equal to 9. Using equations (a) and (b), the common or the fleet profile for the first and the second printers in the image printing system is calculated, and the common or a fleet profile includes a minimum luminance value profile $L^*_{min\ c}$ equal to 9. This common or a fleet profile with a minimum luminance value profile $L^*_{min\ c}$ of 9 should be used as the minimum luminance value for both the first printer and the second printer of the image printing system, thus achieving the color consistency in the image printing system 10.

In one embodiment, the minimum luminance value profile $L^*_{min\ c}$ calculated using equations (a) and (b) is a common, realizable value and is the highest minimum luminance value in the parallel printing system. In other words, the minimum luminance value profile $L^*_{min\ c}$ can only be the highest minimum luminance value among all the minimum luminance values in the parallel printing system, because the printers in the parallel printing system are only configured to increase their minimum luminance value to achieve the minimum luminance value profile and are not configured to decrease their minimum luminance value to achieve the minimum luminance value profile.

The common or the fleet profile for the plurality of printers in the image printing system discussed above produces the best match for the printers, but it may also degrade the image quality for the printer with a lower minimum luminance value L*. In such a case, as will be explained in detail below, when the minimum luminance value profile $L^*_{min\ c}$ is too high (i.e., in comparison with the printer having lowest minimum luminance value in the parallel printing system), the Maximum Density ("Dmax") value (i.e., the maximum Developed Mass per unit Area (DMA) on the image bearing surface for each of the color separations) in the lightest printer (i.e., the printer having lowest minimum luminance value in the parallel printing system) in the parallel printing system is adjusted to compensate for the image degradation.

Generally, control of the field strength and the uniformity of the charge on an image bearing surface of a printer is important because consistently high quality reproductions are best produced when a uniform charge having a predetermined magnitude is obtained on the image bearing surface. Also, achieving consistent print color quality in the xerographic imaging device is a difficult control problem. To ensure satisfactory print quality, the developed mass per unit area (DMA) may be controlled. DMA may be controlled by the adjusting one or more control actuators, such as the development field voltage, intensity of the laser light and charge on the image bearing surface.

Optical and/or voltage sensors are typically used to measure toner development values on the image bearing surface that represent the DMA. Typically process control system of a toner imaging device uses a feedback loop to control image reflective density. Image reflectance density (i.e., measured and used to adjust toner development parameters, such as the development field) is used to obtain a desired reflectance density of subsequent prints and to maintain the DMA in a desired range.

Maximum Density ("Dmax") is the maximum Developed Mass per unit Area (DMA) on the image bearing surface for each of the color separations. This translates to maximum Transferred Density ("Tmax"), which is the maximum Transferred Mass per unit Area (TMA) on the substrate once the toner is transferred to the printed substrate. In particular, Dmax (Tmax) correspond to the density of a halftone having a 100% toner area coverage when printed. Dmax and TMA may be assumed in some instances to equal in value. Dmax is a factor in image quality because it determines the range of tones that can be produced in the printer. For example, the Dmax values the Xerox Corp iGen4® Digital Production Press typically range from about 0.9-1.6 mg/cm².

For example, in TIPP architecture having two printers, the first printer may include minimum luminance value $L^*_{min\ 1}$ value equal to 8 and the second printer may include minimum luminance value $L^*_{min\ 2}$ value equal to 20. Using equations (a) and (b), the common or a fleet profile for the first and the second printers in the image printing system is calculated, and the common or a fleet profile includes a minimum luminance value profile $L^*_{min\ c}$ equal to 20. In such an embodiment, when the minimum luminance value profile $L^*_{min\ c}$ of 20 is too high (i.e., when compared to the minimum luminance value of the first printer that is equal to 8), the Dmax value in the lightest printer (i.e., the first printer) in the image printing system is adjusted to compensate for image degradation. In an embodiment, a program or a routine is often run in the print engines to adjust the relative reflectance-high targets (i.e., setpoints used to adjust the Dmax in the process control loops) using reflectance measurements on the image bearing surface (i.e., the photoreceptor belt).

In accordance with another embodiment, the determined common minimum luminance value $L^*_{min\ c}$ is for a customized profile for each of the printers in the image printing system. The common minimum luminance value $L^*_{min\ c}$ of the customized profile is defined as $$L^*_{min\ c} = L^*_{min\ 1} + \alpha(L^*_{min\ 2} - L^*_{min\ 1}) \quad \text{(c)}$$

where $L^*_{min\ c}$ is a minimum luminance value for the customized profile; $L^*_{min\ 1}$ is a minimum luminance value for a first printer in the image printing system; α is a constant; and $L^*_{min\ 2}$ a minimum luminance value for a second printer in the image printing system. The value of the constant α is between 0 and 1. For example, when α is zero, $L^*_{min\ c}$ takes the minimum luminance value of the first printer, when α is 1, $L^*_{min\ c}$ takes the minimum luminance value of the second printer, and when α is 0.5, $L^*_{min\ c}$ takes the average minimum luminance value of the first printer and the second printer.

In one embodiment, the minimum luminance value profile $L^*_{min\ c}$ calculated from equation (c) may be used as the minimum luminance value for both first and the second printers. If the profiles are customized, the minimum luminance value profile $L^*_{min\ c}$ calculated from equation (c) may be used as the minimum luminance value for the first printer, while the second printer will have minimum luminance value of $L^*_{min\ 2}$.

The present disclosure is not limited to an image printing system having two printers. Instead, if the image printing system includes multiple printers, such as three, four, or more printers, the customized profile for each of the plurality of printers in the image printing system is calculated using the following equation:

$$L^*_{minc} = \frac{(L^*_{min1} + \ldots + L^*_{minN})}{N} \quad (d)$$

where $L^*_{min\ c}$ is a minimum luminance value for the customized profile; $L^*_{min\ 1}$ is a minimum luminance value for a first printer in the image printing system; $L^*_{min\ N}$ is a minimum luminance value for a Nth printer in the image printing system; and N is a total number of printers in the image printing system.

Next, at procedure 420, the controller is configured to determine a black point compensation function based on the determined minimum luminance value profile.

The black point compensation function may be modeled according to a quadratic or parabolic function with x values representing the input L* (input image data) axis and y values representing the output L* (image data to be rendered by the printer) axis, according to equation (1), as follows:

$$y = x_0 + mx + ax^2 \quad (1)$$

where $x_0 = L^*_{min\ c}$ (i.e., the minimum luminance value profile for the plurality of printers in the image printing system 10 at which dark colors are to be mapped), and m is the slope of the curve. The slope constant m is set to about 0.6 for RGB input image data and the slope constant m is set to about 0 for CYMK input image data. For example, by changing the value of the slope constant, m, the appearance of details in the images may be changed. In an embodiment, m value is fixed to a constant value.

Taking the derivative with respect to x in equation (1) yields:

$$\frac{dy}{dx} = m + 2ax \quad (2)$$

A break point $x_c$ may be defined which sets the point (i.e., the maximum input luminance value) where the black point compensation is no longer to be applied.

For example, if the break point $x_c$ is moved to a higher input luminance value L*, for example, L*=70, then the black point compensation will be applied to colors with L* values from approximately 0 to 70 only. Otherwise, for L* values greater than the break point $x_c$ the output luminance values will be the same as the input luminance values. This is because, as the input luminance values increase, the image requires less toner to render, and no black point compensation is required.

In another implementation, black point compensation may be applied to darker colors, and the break point $x_c$ may be set to a luminance value L*=50. Applying the compensation to lighter colors may de-saturate chromatic colors (e.g., chromatic blue colors can become less chromatic or chromatic red colors can become less red). Of course different break point values are also possible.

For values of $x \geq x_c$ with $x_c$ as the break point, the output may be equal to input, i.e., $$\frac{dy}{dx} = 1.$$

Hence, equation (2) may be written as, $$m + 2ax = 1 \quad (3)$$

The coefficient, a can then be found at the break point $x_c$ from equation (3) according to equation (4):

$$a = \frac{1-m}{2x_c} \quad (4)$$

and $$y_c = x_c = x_0 + mx_c + ax_c^2 \quad (5)$$

Substituting, equation (4) into equation (5) yields:

$$x_c = x_0 + mx_c + \frac{1-m}{2x_c}x_c^2 \quad (6)$$

Which further reduces to equation (7):

$$x_c = \frac{2x_0}{1-m} \quad (7)$$

By substituting equation (7) in equation (4), the coefficient, α may be defined in terms of $x_0$ and m as follows:

$$a = \frac{(1-m)^2}{4x_0} \quad (8)$$

Equations (1) and (8) then may be used to form the BPC function according to equations (9) and (10), below, depending on whether the break point is reached:

$$y = x_0 + mx + \left(\frac{(1-m)^2}{4x_0}\right)x^2 : x < x_c \quad (9)$$

$$y = x : x \geq x_c \quad (10)$$

Accordingly, the BPC curve has been modeled into a function having two inputs parameters; $x_0$ and m, where $x_0 = L^*_{min\ c}$, the value of which is calculated using equations (a)-(d), and m as the slope of the parabolic function. In one implementation, for example, only $x_0$ and m are provided as inputs to the BPC function. Equation (7) may be used to compute break point $x_c$: For instance, for x=12 and m=0.6, $x_c$=60.

The slope m of the function may be determined based on the color space of the input image data. In one example, for RGB color space, m may be 0.6, and for CMYK, m may be 0.

Next, at procedure 430, the controller 148 is configured to adjust luminance values for input image data using the determined black point compensation function. At procedure 440, the marking engines associated with parallel printers of the image printing system are configured to render images on substrates based on the input image data with adjusted luminance levels. In other words, images corresponding to the input image data may be rendered on substrates based on the adjusted luminance levels by the parallel printers. Finally, the method 400 ends at procedure 445.

The controller 148 may be provided to control the various elements and sequence of operations of the image printing system 10 (FIG. 1) in accordance with the various embodiments disclosed herein. In some implementations, the controller may be dedicated hardware like ASICs or FPGAs, software (firmware), or a combination of dedicated hardware and software. For the different applications of the embodiments disclosed herein, the programming and/or configuration may vary. In one embodiment, the controller may be a digital front end (DFE) associated with the printer.

The term "media," as used herein, may include a sheet of paper, such as a standard 8½×11 inch letter paper, A4 paper, or 8½×14 inch legal paper. However, it will be appreciated that "media" may include other sizes and printable media types, such as, bond paper, parchment, cloth, cardboard, plastic, transparencies, film, foil, or other print media substrates, whether precut or web fed. Any reference to paper is not to be construed as limiting. Different grade and/or gloss media may be used. Printed sheets may be referred to as "output" or "printed media."

The term "print job" or "document" is normally a set of related sheets, usually one or more collated copy sets copied from a set of original print job sheets or electronic document page images, from a particular user, or otherwise related.

The term "image printing system" as used herein encompasses any device, such as a copier, bookmaking machine, facsimile machine, or a multi-function machine. In addition, the word "image printing system" may include ink jet, laser or other pure printers, which performs a print outputting function for any purpose. The term "image printing assembly," as used herein incorporates a plurality of printers, and may include other components, such as finishers, paper feeders, and the like, which may all be under the control of a common control system or a controller.

The term "independent marking engine" or "printer," as used herein broadly encompasses a print engine or copier, xerographic or otherwise, capable of applying an image to print media.

The term "finisher," as used herein encompasses any post-printing accessory device, in which printed media from two or more printers is combined, such as an inverter, reverter, sorter, mailbox, inserter, interposer, folder, stapler, stacker, collater, stitcher, binder, over-printer, or the like.

The terms "charge retentive surface" or "image bearing surface," as used herein is selected from the group consisting of a photoreceptor drum, a photoreceptor belt, an intermediate transfer belt, and an intermediate transfer drum. That is, the term image bearing surface means any surface on which a toner image is received, and this may be an intermediate surface (i.e., a drum or belt on which a toner image is formed prior to transfer to the printed document). For example, a "tandem" xerographic color printing systems (e.g., U.S. Pat. Nos. 5,278,589; 5,365,074; 6,904,255 and 7,177,585, each of which are incorporated by reference), typically include plural print engines transferring respective colors sequentially to an intermediate image transfer surface (e.g., belt or drum) and then to the final substrate.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for calibrating an image printing system comprising a plurality of parallel printers, each of the printers having a minimum luminance value, the method comprising:

determining a minimum luminance value profile for the plurality of printers in the image printing system based on the minimum luminance values of each of the printers in the image printing system;

determining a black point compensation function based on the determined minimum luminance value profile;

adjusting luminance values for input image data using the determined black point compensation function; and rendering, with the parallel printers, images on substrates based on the input image data with adjusted luminance levels, wherein the black point compensation function is configured to retain shadow details in the images rendered by the plurality of parallel printers and to ensure the shadow details in the rendered images across the plurality of parallel printers match with each other, wherein the black point compensation function is determined using the following equation:

$$y = x_0 + mx + ax^2$$

where $x_0$ is the determined minimum luminance value profile for the plurality of printers in the image printing system.

m is a slope constant of black point compensation function;

x values representing input luminance (L*) axis or input image data.

y values representing output luminance (L*) axis or image data to be rendered by the plurality of printers; and a is a constant.

2. The method according to claim 1, wherein the determined profile is a common profile for the plurality of printers in the printing system.

3. The method according to claim 2, wherein the minimum luminance value of the common profile is the maximum value of the minimum luminance value of each of the printers in the image printing system.

4. The method according to claim 1, wherein the determined profile is a customized profile for each of the plurality of printers in the image printing system.

5. The method according to claim 4, wherein the minimum luminance value of the customized profile is defined as $$L^*_{min\ c} = L^*_{min\ 1} + \alpha(L^*_{min\ 2} - L^*_{min\ 1})$$

where:

$L^*_{min\ c}$ is a minimum luminance value for the customized profile;

$L^*_{min\ 1}$ is a minimum luminance value for a first printer in the image printing system;

$\alpha$ is a constant; and $L^*_{min\ 2}$ a minimum luminance value for a second printer in the image printing system.

6. The method according to claim 5, wherein the value of the constant is between 0 and 1.

7. The method according to claim 4, wherein the minimum luminance value of the customized profile is defined as $$L^*_{minc} = \frac{(L^*_{min1} + \ldots + L^*_{minN})}{N}$$

where:

$L^*_{min\ c}$ is a minimum luminance value for the customized profile;

$L^*_{min\ 1}$ is a minimum luminance value for a first printer in the image printing system;

$L^*_{min\ N}$ is a minimum luminance value for a Nth printer in the image printing system; and N is a total number of printers in the printing system.

8. A system for calibrating an image printing system comprising a plurality of parallel printers, each of the printers having a minimum luminance value, the system comprising:

a controller configured to: (i) determine a minimum luminance value profile for the plurality of printers in the image printing system based on the minimum luminance values of each of the printers in the image printing system; (ii) determine a black point compensation function based on the determined minimum luminance value profile; and (iii) adjust luminance values for input image data using the determined black point compensation function; and marking engines associated with the parallel printers configured to render images on substrates from input image data with adjusted luminance levels, wherein the black point compensation function is configured to retain shadow details in the images rendered by the plurality of parallel printers and to ensure the shadow details in the rendered images across the plurality of parallel printers match with each other, wherein the black point compensation function is determined using the following equation:

$$y = x_0 + mx + ax^2$$

where $x_0$ is the determined minimum luminance value profile for the plurality of printers in the image printing system;

m is a slope constant of black point compensation function;

x values representing input luminance (L*) axis or input image data.

y values representing output luminance (L*) axis or image data to be rendered by the plurality of printers; and a is a constant.

9. The system according to claim 8, wherein the determined profile is a common profile for the plurality of printers in the printing system.

10. The system according to claim 8, wherein the determined profile is a common profile for plurality of printers in a networked image printing system.

11. The system according to claim 9, wherein the minimum luminance value of the common profile is the maximum value of the minimum luminance value of each of the printers in the image printing system.

12. The system according to claim 8, wherein the determined profile is a customized profile for each of the plurality of printers in the image printing system.

13. The system according to claim 12, wherein the minimum luminance value of the customized profile is defined as $$L^*_{min\ c} = L^*_{min\ 1} + \alpha(L^*_{min\ 2} - L^*_{min\ 1})$$

where:

$L^*_{min\ c}$ is a minimum luminance value for the customized profile;

$L^*_{min\ 1}$ is a minimum luminance value for a first printer in the image printing system;

$\alpha$ is a constant; and $L^*_{min\ 2}$ a minimum luminance value for a second printer in the image printing system.

14. The system according to claim 13, wherein the value of the constant is between 0 and 1.

15. The system according to claim 12, wherein the minimum luminance value of the customized profile is defined as $$L^*_{minc} = \frac{(L^*_{min1} + \ldots + L^*_{minN})}{N}$$

where:

$L^*_{min\ c}$ is a minimum luminance value for the customized profile;

$L^*_{min\ 1}$ is a minimum luminance value for a first printer in the image printing system;

$L^*_{min\ N}$ is a minimum luminance value for a Nth printer in the image printing system; and N is a total number of printers in the image printing system.

* * * * *